(12) United States Patent
Park

(10) Patent No.: US 7,290,678 B2
(45) Date of Patent: Nov. 6, 2007

(54) CUP HOLDER FOR A VEHICLE

(75) Inventor: Woo Chul Park, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 416 days.

(21) Appl. No.: 10/750,679

(22) Filed: Dec. 31, 2003

(65) Prior Publication Data
US 2005/0072780 A1     Apr. 7, 2005

(30) Foreign Application Priority Data
Oct. 2, 2003     (KR)     ...................... 10-2003-0068881

(51) Int. Cl.
*B65D 25/00*     (2006.01)
(52) U.S. Cl. ................. 220/737; 220/738; 220/739
(58) Field of Classification Search ................. 220/737, 220/738
See application file for complete search history.

(56) References Cited

U.S. PATENT DOCUMENTS

| | | | |
|---|---|---|---|
| 6,622,886 B2* | 9/2003 | Kaupp et al. | 220/737 |
| 6,702,243 B2* | 3/2004 | Takeichi | 248/311.2 |
| 6,722,540 B2* | 4/2004 | Ling | 224/275 |
| 2002/0100761 A1* | 8/2002 | Kaupp et al. | 220/737 |

FOREIGN PATENT DOCUMENTS

| | | |
|---|---|---|
| JP | 2001-253289 | 9/2001 |
| JP | 2002-274242 | 9/2002 |
| JP | 2002-331862 | 11/2002 |
| JP | 2003-191783 | 7/2003 |

* cited by examiner

*Primary Examiner*—Anthony D. Stashick
*Assistant Examiner*—Shawn M. Braden
(74) *Attorney, Agent, or Firm*—Morgan Lewis & Bockius LLP

(57) ABSTRACT

A cup holder for a vehicle has a rotation type support structure. The cup holder includes a support member which can rotate horizontally around a rotary shaft of a surrounding portion of a container insertion member and closely contact the outer surface of a beverage container inserted into a container insertion member. A locking member fixes the support member at a predetermined rotation angle on the rotary shaft using a button installed on the support member. The cup holder of the present invention can stably support a beverage container of various sizes. In addition, rattling noise as well as beverage spill that might occur during a shaky movement of a beverage container can be effectively prevented.

5 Claims, 5 Drawing Sheets

('B1-B1' Cross-sectional view)

('B2-B2' Cross-sectional view)

CUP HOLDER FOR A VEHICLE

CROSS-REFERENCE TO RELATED APPLICATIONS

This application claims priority to Korean Application No. 10-2003-0068881, filed on Oct. 2, 2003, the disclosure of which is incorporated fully herein by reference.

FIELD OF THE INVENTION

The present invention relates to a cup holder for a vehicle and, more particularly, a cup holder having a rotation type support structure to accommodate different sized containers.

BACKGROUND OF THE INVENTION

Due to improvement in road conditions and living standards worldwide, it is now very common to see people travel long distances with their own vehicles. During long distance travel, a driver or a passenger often drinks various kinds of beverages and water in the vehicle. Therefore, a cup holder has been provided to accommodate and support a beverage can or cup. Generally, a cup holder is provided in a crash pad or a console box or installed in the vehicle. The cup holder can prevent beverage spill when there is a shaky movement of a vehicle by holding it in a secured beverage container (a beverage can or cup).

There have been manufactured various types of cup holders for a vehicle. For example, Japanese Patent laid-open No. 2002-331862 discloses a multifunctional tray detachable from a cup holder installed in a vehicle. Japanese Patent laid-open No. 2003-191783 discloses a cup holder having a plate-shape cup with an accommodating part which is integrally formed in a holder body and is elastically deformable. A hole is formed in the cup accommodating part for removing moisture collected in a cup. Japanese Patent laid-open No. 2002-274242 discloses a cup holder in which a hollow casing is installed in a vehicle, and a cup support member is accommodated in the hollow casing. Japanese Patent laid-open No. 2001-253289 discloses a cup holder in an armrest, where a tiltable cover is installed on an upper surface of a holder to prevent beverage spill.

FIG. 9 is a perspective view illustrating a type of a cup holder installed in a console box of a vehicle. The cup holder of the console box has an insertion groove 101 for accommodating a container 1 with beverage on an upper surface of the console box 100. A driver or a passenger can store his unfinished beverage in the above cup holder and continue to drink the stored beverage as desired. However, conventional cup holders were designed to simply accommodate a beverage can or cup with certain shapes and sizes and are therefore not able to accommodate a beverage can or cup with special sizes and shapes.

In fact, the conventional cup holders have been manufactured in a rather uniform fashion in accordance with a conventional console box, where the size of accommodation is already determined. Therefore, it has been almost impossible to securely support a beverage container of various sizes. Further, when a beverage container is not precisely fit to the size of a holder, the container can easily escape from the holder, so that the liquid content of the container is easily spilled. In addition, the above-described unexpected hazard may even lead to a vehicle accident.

Therefore, it has been required to develop a cup holder for a vehicle which can stably accommodate and store beverage containers of various sizes.

SUMMARY OF THE INVENTION

Embodiments of the present invention provide a cup holder for a vehicle which comprises a support member that horizontally rotates around a rotary shaft. A surrounding portion of a container insertion member closely contacts the outer surface of a beverage container inserted into a container insertion, and a locking member is adapted to fix the support member at a predetermined rotation angle. Therefore, the cup holder of the present invention can stably support a beverage container in a container insertion member irrespective of its size. Further, it can prevent noises occurring due to a movement of a beverage container as well as beverage spill.

In a preferred embodiment of the present invention, a cup holder comprises a rotation bushing installed in such a manner that the rotation bushing surrounds an outer surface of a rotary shaft of a container insertion member and compresses or decompresses the outer surface of the rotary shaft. A rotation on the rotary shaft is thus selectively limited. A support member is installed in an upper side of the rotation bushing and has a curved surface closely contacting with outer surface of the beverage container accommodated in the container insertion member when the support member is rotated with respect to the rotary shaft together with the rotation bushing. A button installed in the support member in such a manner that the rotation bushing and the support member are rotated together. The button is connected with the rotation bushing through a locking part so that the locking part compresses or decompresses the rotation bushing.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1:
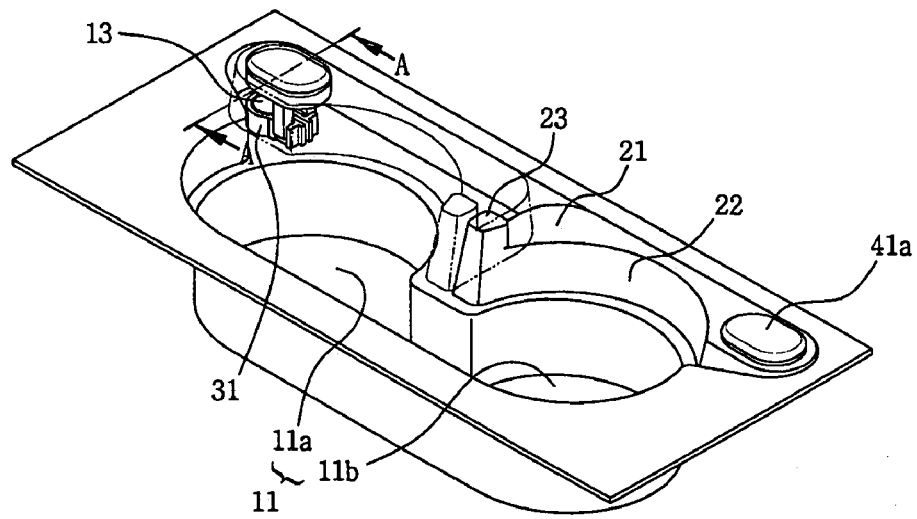
FIG. 1 is a perspective view illustrating the construction of a cup holder according to an embodiment of the present invention.

Hereinafter, such embodiments of the present invention are described in detail with reference to the accompanying drawings.

In the accompanying drawings, reference numeral 11 represents an insertion member for accommodating the beverage container 1 therein. In the embodiments of the present invention, two neighboring insertion members 11a and 11b with different diameters are continuously formed as an insertion member (hereinafter referred to as a container insertion or container insertion member) for accommodating a container of beverage.

Figure 2:
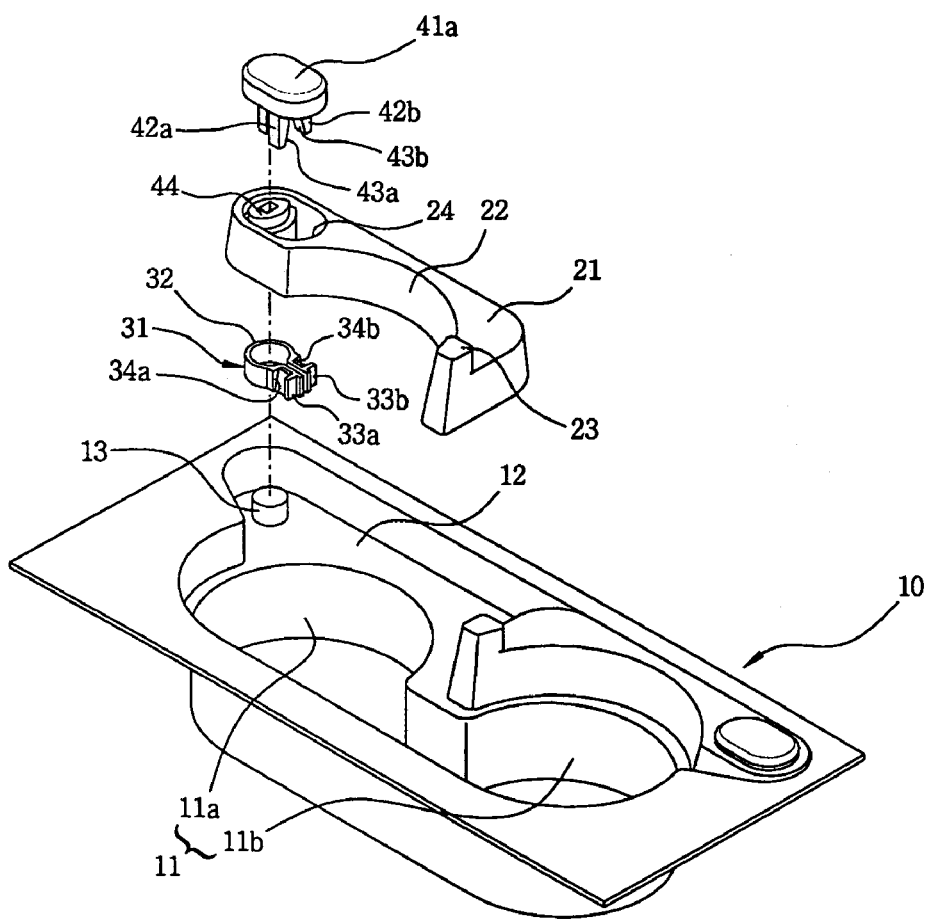
FIG. 2 is an exploded view illustrating a cup holder according to an embodiment of the present invention.

Referring to FIGS. 1 and 2, a support member of horizontal rotation type 21 is installed in each container insertion 11 of the cup holder 10 for providing a stable and supportive force. The horizontal support member of rotation type 21 closely contacts an outer surface of the container 1 irrespective of the size of the container when a beverage container (such as a beverage can or cup) is inserted in each container insertion 11. The support member 21 is installed in such a manner that it is horizontally rotatable around a rotary shaft 13 at both sides of the cup holder 10 on the tray 12 in a surrounding portion of the container insertion 11. An inner side of each support member has a concave curvature for thereby closely contacting an outer surface of the containers 1 of various sizes. In addition, an upwardly protruding handle 23 is formed at a free end of each support member 21, so that a user can easily rotate the support member 21.

A rotation bushing 31 is installed on the rotary shaft 13. Encompassing the outer surface of the rotary shaft 13, bushing 31 is connected with a button 41a installed in the support member 21. Bushing 31 compresses or decompress on the outer surface of the rotary shaft 13 in accordance with an operation of the button 41a for thereby selectively limiting the rotation of the support member 21.

The rotation bushing 31 is installed in a lower side of the rotation center portion of the support member 21. When the support member 21 is rotated, it is rotated on the outer surface of the rotary shaft 13 by the button 41a installed between the support members 21. The rotation bushing 31 includes a cylindrical elastic compression part 32 which encompasses outer surface of the rotary shaft 13. The cylindrical elastic compression part 32 is open at one end thus separating its ends 33a and 33b from each other. An inner surface of the cylindrical elastic compression part 32 directly compresses or decompresses against the outer surface of the rotary shaft 13. In addition, the separated ends 33a and 33b of the compression part 32 are elongated outwardly in a radius direction, and have slanted surfaces 35a and 35b.

Figure 3:
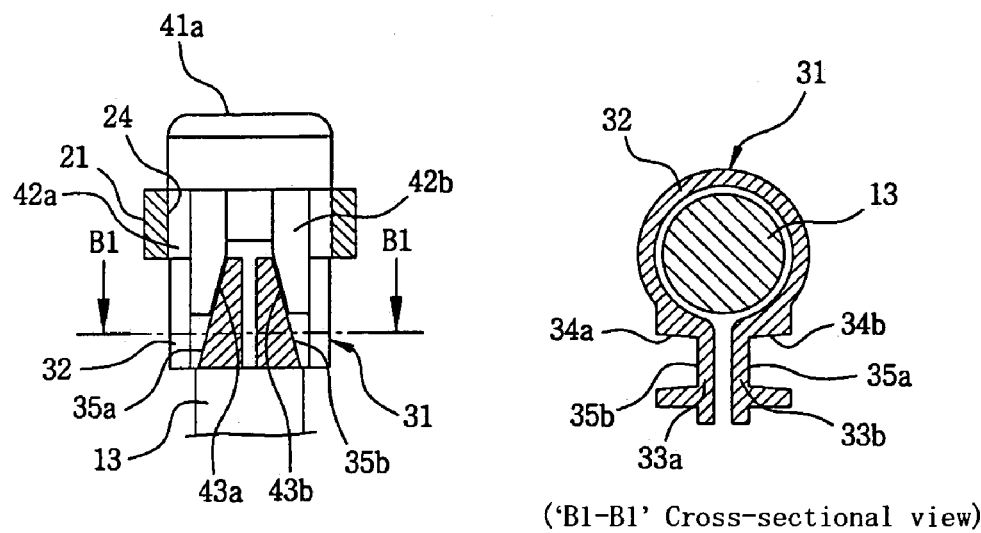
FIG. 3 is a cross sectional view illustrating a locking structure of a rotation bushing having a push lock switch according to an embodiment of the present invention.
Figure 4:
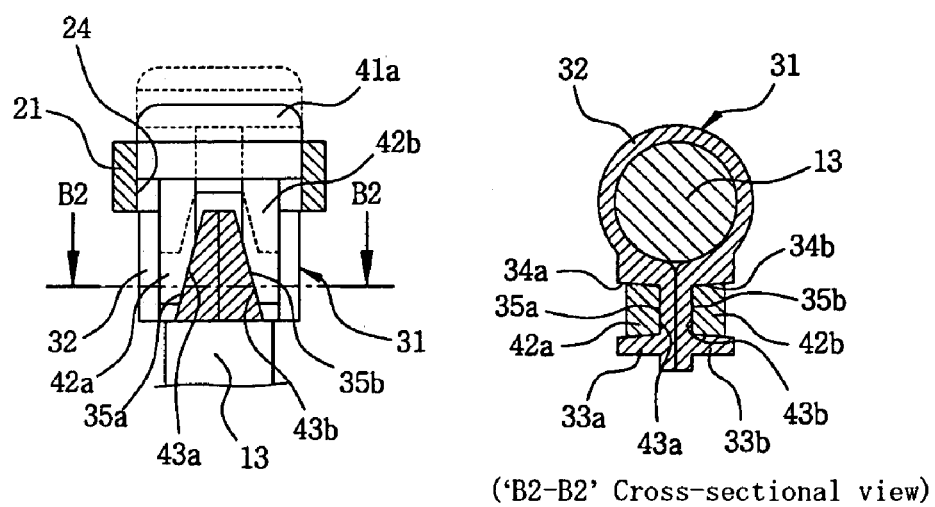
FIG. 4 is a cross sectional view illustrating a state in which a locking structure of a rotation bushing having a push lock switch is locked according to the present invention.

As shown in FIGS. 3 and 4, the slanted surfaces 35a and 35b are formed with a wedge-shaped structure. Grooves 34a and 34b are formed in the outer lateral surfaces of the separated ends 33a and 33b of the compression part 32 for accommodating locking parts 42a and 42b therein. Slanted surfaces 35a and 35b are formed in an inner surface of the grooves 34a and 34b.

The slanted surfaces 35a and 35b are symmetrical with each other along the outer lateral sides of the ends 33a and 33b of the compression part 32. The thickness of the inner surfaces of the grooves 34a and 34b is gradually increased as it goes to the lower side due to the slanted surfaces 35a and 35b.

The separated ends 33a and 33b of the compression part 32 become narrower or wider as the pressure parts 42a and 42b of the button 41a slide on the slanted surfaces 35a and 35b. When the ends 33a and 33b of the compression part 32 are widened, clearance is formed between an inner surface of the compression part 32 and outer surface of the rotary shaft 13, so that the rotation bushing 31 becomes rotatable (FIG. 3). On the contrary, when the ends 33a and 33b of the compression part 32 are forced together, the inner surface of the compression part 32 compresses outer surface of the rotary shaft 13, so that the rotation of the rotation bushing 31 is locked by a friction force.

The rotation bushing 31 is positioned at a lower side of the rotation center portion of each support member 21, and the elastic compression part 32 surrounds the rotary shaft 13. The compression part 32 is deformed based on an operation that the separated ends 33a and 33b of the compression part 32 become narrower or wider. The inner surface of the rotation bushing 31 selectively compresses or decompresses the outer surface of the rotary shaft 13 thereby locking or unlocking the rotation of the rotation bushing 31 depending on the above operation.

In the rotation bushing 31, the widening operation of the separated ends 33a and 33b of the compression part 32 is performed by an elastic force when a force that the locking parts 42a and 42b of the button 41a act upon the slanted surfaces 35a and 35b from the outer side is removed. When rotating the support member 21, the rotation bushing 31 is rotated in the same direction as the support member 21. A portion connecting the rotation bushing 31 and the support member 21 operates as a button 41a.

The button 41a is installed between the support member 21 and the rotation bushing 31 so that the rotation of the rotation bushing 31 is selectively locked or unlocked. The button 31 is connected with the rotation bushing 31 at a lower side of the support member 21 through an engaging hole 24 which vertically passes through the rotation center portion of the support member 21.

The button as shown in the embodiment of FIGS. 3 and 4 is a push-and-lock type button. Two locking parts 42a and 42b are elongated downwardly from a lower surface of the button 41a in parallel. The two locking parts 42a and 42b are inserted into grooves 34a and 34b formed in the outer lateral sides of the ends 33a and 33b of the rotation bushing positioned in a lower side of the support member 21. The slanted surfaces 43a and 43b corresponding to the slanted surfaces 35a and 35b of the grooves 34a and 34b are formed in the lower inner surfaces of the locking parts 42a and 42b. When the button 41a ascends or descends, the slanted surfaces 43a and 43b of the locking parts 42a and 42b slide along the slanted surfaces 35a and 35b of the grooves 34a and 34b of the ends 33a and 33b of the rotation bushing.

In the push-and-lock button 41a, the button 41 is elastically operated by a one-touch method in the engaging hole 24 of the support member 21. The button 41a is fixed in a pushed state in the engaging hole 24 of the support member 21 by a one-touch operation part (not shown in FIG. 1, reference number 44 in FIG. 2) installed between the support members 21 when a user pushes one time. When a user pushes the button 41a additionally, the button 41a is moved upwardly by a spring (not shown) of the one-touch operation part 44 in accordance with the one-touch operation method.

When the button 41a is moved downwardly, the locking parts 42a and 42b are inserted into the grooves 34a and 34b of the ends 33a and 33b of the rotation bushing, and the slanted surfaces 43a and 43b slide downwardly on the slanted surfaces 35a and 35b in a corresponding groove. As shown in FIG. 4, when the button 41 is fixed in a pushed state by the wedge slide structure, the ends 33a and 33b of the compression part 32 are narrowed from the outer side to the inner side when the slanted surfaces 43a and 43b of the button locking parts 42a and 42b compress the slanted surfaces 35a and 35b, so that the rotation of the rotation bushing 31 is locked.

In the above locked state, the inner surface of the compression part 32 of the rotation bushing 31 compresses and holds the outer surface of the rotary shaft 13. Therefore, the rotation of the rotation bushing 31 is limited by a friction force between the two surfaces.

When the button 41a is moved upwardly, the slanted surfaces 43a and 43b of the locking parts 42a and 42b slide in the upper direction on the slanted surfaces 35a and 35b in the grooves of the ends of the rotation bushing 31. When the button 41a is positioned at an upper portion, as shown in FIG. 3, the force applied to the slanted surfaces from the outer side to the inner side is released, so that the separated ends 33a and 33b of the rotation bushing 31 are widened by the elastic force.

A clearance is formed between an inner surface of the compression part 32 of the rotation bushing 31 and outer surface of the rotary shaft 13, so that the locking is unlocked. Accordingly, the locked rotation of the rotation bushing 31 is unlocked by the clearance.

When the locked state of the rotation bushing 31 is unlocked, a driver can rotate the support member 21 to a desired angle. At the adjusted angle, the button 41a may be pushed to lock the rotation of the support member 21. The procedure for rotation of the rotation bushing 31 to be locked at the adjusted position is the same as in the earlier descriptions.

The one-touch operation part 44 is provided for performing a one-touch operation of the button 41a using a spring force based on a push and release operation. The one-touch operation part 44 is installed between the button 41a and the support member 21. The one-touch operation part 44 may be implemented by a person of ordinary skill in the art based on known designs.

Figure 5:
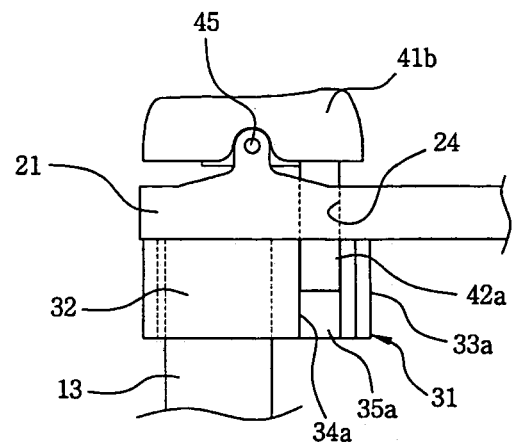
FIG. 5 is a lateral view illustrating an example of a button adapted to lock a rotation of a rotation bushing and a support member according to the present invention.

FIG. 5 shows a view of another example of the button for locking the rotation of the rotation bushing 31 and the support member. In this embodiment, the button is a seesaw type button. Namely, a hinge part 45 is installed at left and right sides of the engaging hole 24 at the upper surface of the support member, and the center of the button 41b is connected with the hinge part 45. The button 41b rotates with respect to the hinge part 45 provided between the support members 21. Locking parts 42a and 42b, as in the push-and-lock button structure, are provided on the lower surface of the button 41b. Since the seesaw type button 41b is rotatable in the hinge unit 45 of the support member 21, the width of the grooves 34a and 34b of both ends of the rotation bushing 31 into which the locking parts 42a and 42b are inserted is slightly wider than that when the push-and-lock button is used.

When a user pushes the side where the locking parts 42a and 42b of the button 41b are installed, the button 41b rotates with respect to the hinge part 45 of the support member, and the locking parts 42a and 42b are moved downwardly. Operation of the locking parts 42a and 42b to lock the rotation bushing 31 on the rotary shaft is the same as the earlier described operation of the push-and-lock button.

When the user pushes the opposite side of the button 41b once, the button 41b rotates in the reverse direction with respect to the hinge part 45 of the support member 21, and the locking parts 42a and 42b are moved upwardly. The operation of locking parts 42a and 42b to unlock the rotation bushing 31 on the rotary shaft 13 is the same as the earlier operation of the push-and-lock button.

The hinge unit 45 of the support member 21 may be installed by using various methods. In another embodiment of the present invention, the button 41b may be partially inserted into the engaging hole 24 of the support member 21, and the hinge part 45 may be installed at both sides of the button 41b in the engaging hole 24.

Figure 6:
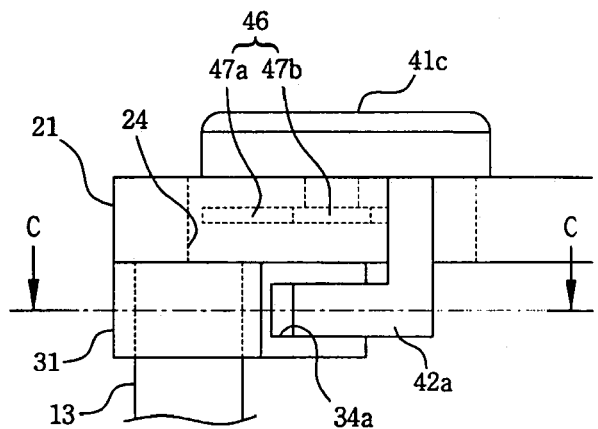
FIG. 6 is a lateral view illustrating another example of a button adapted to lock a rotation of a rotation bushing and a support member according to the present invention.
Figure 7A:
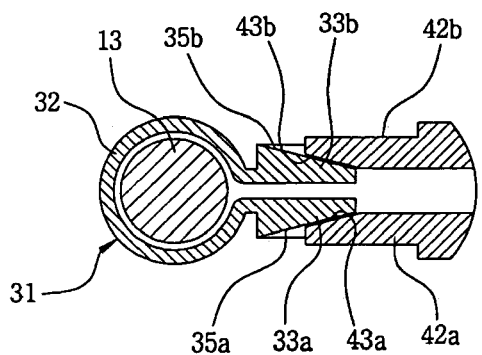
FIGS. 7A and 7B are cross sectional views taken along the line C-C of FIG. 6 illustrating operating states according to the present invention.
Figure 7B:
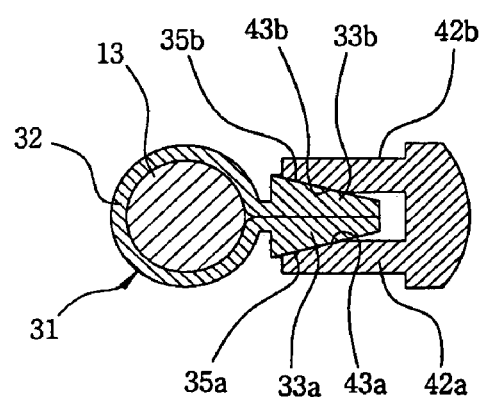

Referring to FIGS. 6, 7A and 7B, a further alternative embodiment is described. Slide type button 41c is forwardly and backwardly slidable by a slide part 46 separately provided at a lower portion of the button 41c and at both sides of the engaging hole 24 of the support member 21. The slide part 46 comprises a groove 47a formed longitudinally in the same direction as the forward and backward slide movement direction of the button 41c at both lateral sides of the interior of the engaging hole 24. A rail 47b protrudes in the direction of both lateral sides of the lower side of the button 41c for thereby being inserted into the rain groove 47a.

In the above slide type button 41c, two locking parts 42a and 42b are elongated downwardly from the lower surface of the button 41c and pass through the engaging hole 24 of the support member 21. The locking parts are bent in the direction of the ends 33a and 33b of the compression part of the rotation bushing 31. When the button 41c is moved forwardly or backwardly, the slanted surfaces 43a and 43b formed in the inner surfaces of the front ends of the two locking parts 42a and 42b slide on the slanted surfaces 35a and 35b formed in the outer surfaces of the separated ends 33a and 33b of the compression part 32.

When the slide type button 41c is used, the slanted surfaces 35a and 35b of the rotation bushing 31 corresponding to the slanted surfaces 43a and 43b of the locking parts 42a and 42b are different from the slanted surfaces of the rotation bushing to which the push-and-lock button and the seesaw type button are adapted. Namely, the slanted surfaces 35a and 35b of the rotation bushing 31 are formed in the inner surface of the grooves 34a and 34b horizontally elongated on the outer surfaces of the ends 33a and 33b of the compression part 32. As shown in FIGS. 7A and 7B, on the slanted surfaces 35a and 35b of the rotation bushing 31, the slanted surfaces 43a and 43b of the locking part of the button 41c are horizontally slidable.

The two parallel locking parts 42a and 42b of the slide type button 41c are horizontally moved and slide on the slanted surfaces 35a and 35b of the rotation bushing, so that the separated ends 33a and 33b of the compression part 32 become narrower or wider depending on the slide direction. On the slanted surfaces 35a and 35b of the rotation bushing 31, the sliding direction of the locking parts 42a and 42b becomes vertical with respect to the sliding direction of the locking part in the case of two buttons. The thickness of the slanted surfaces 35a and 35b is gradually decreased in the horizontal direction of the ends.

In the above slide type button 41c, when a user pushes the button 41c in the direction that the bent front ends of the locking parts 42a and 42b are formed in the direction of the rotary shaft 13 in the compression part 32, the button 41c slides along the slide part 46 provided between the support members 21. The slanted surfaces 43a and 43b of the inner side of the front ends of the locking parts 42a and 42b then slide along the slanted surfaces 35a and 35b of the rotation bushing 31. The ends 33a and 33b of the compression part 32 thus become narrower from the outer side to the inner side due to the force generated by the slanted surfaces 43a and 43b of the locking parts 42a and 42b. Whe the ends 33a and 33b of the compression part 32 become narrower, the inner surface of the rotation bushing 31 compresses the outer surface of the rotary shaft 13 in the same manner as the above-described earlier manner, so that the rotation of the rotation bushing 31 is locked (FIG. 7B). When the user slides the button 41c in the reverse direction, the slanted surfaces 43a and 43b of the inner side of the front ends of the locking parts 42a and 42b slide on the slanted surfaces 35a and 35b of the rotation bushing 31 in the reverse direction. When a force applied to press the ends 33a and 33b of the compression part 32 is released, the compression part 32 of the rotation bushing 31 becomes wider, so that the locking of the rotation bushing 31 is unlocked (FIG. 7A). When the locking of the rotation bushing 31 is unlocked, the support member 21 can be rotated to a desired position together with the rotation bushing 31.

Figure 8:
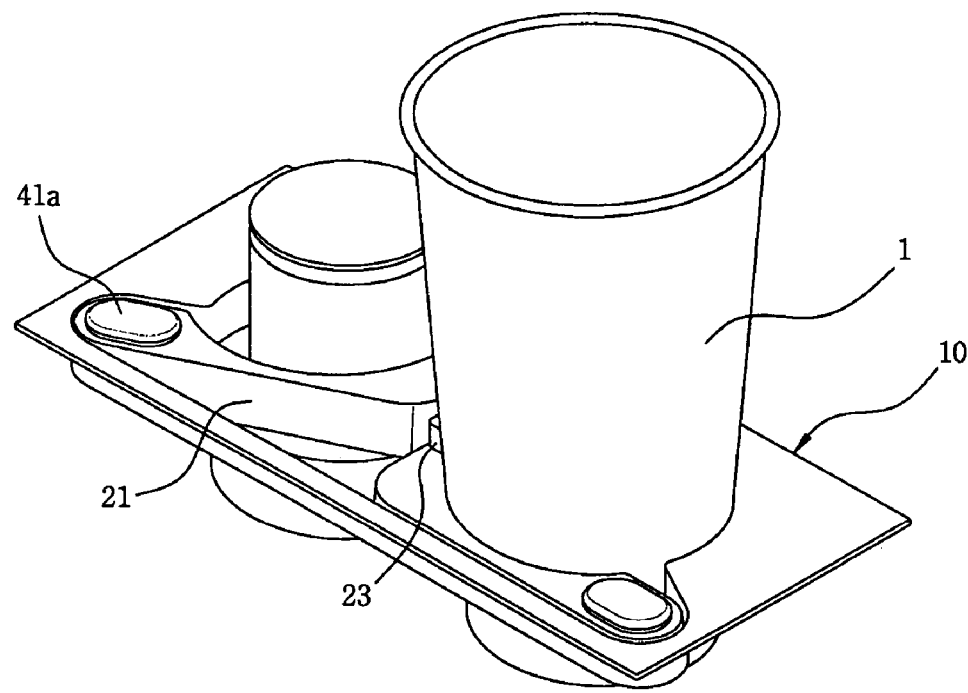
FIG. 8 is a perspective view illustrating a beverage container accommodated in a cup holder according to the present invention.
Figure 9:
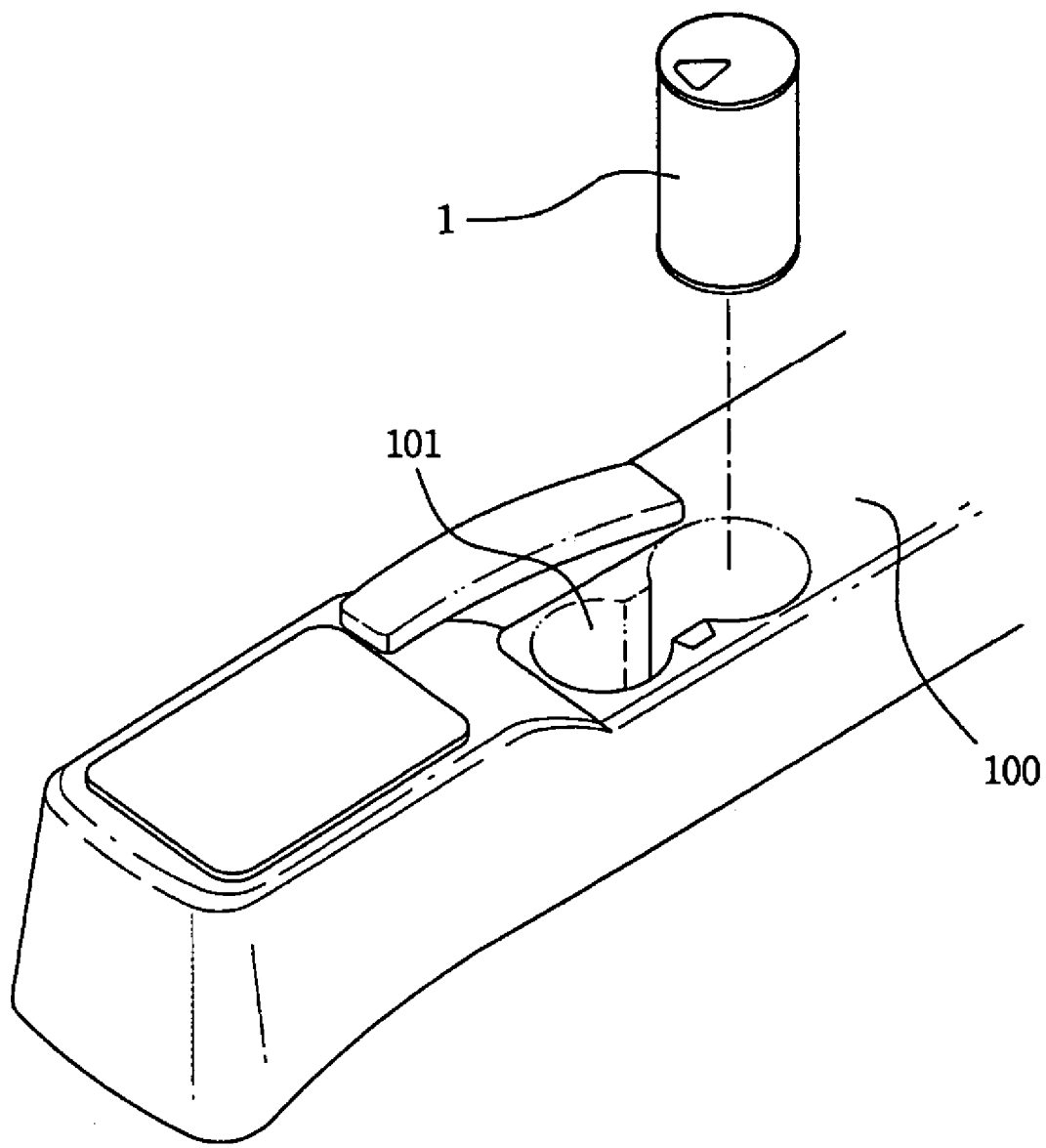
FIG. 9 is a perspective view illustrating a conventional cup holder installed in a console box.

When a user inserts a beverage container 1 into the container insertion member 11, the position of the support member 21 can be adjusted using the handle 23 so that the support member 21 closely contacts the outer surface of the beverage container 1. Thereafter, the positions of the rotation bushing (not shown in FIG. 8) and the support member 21 are fixed by using the button 41a and the beverage container 1 is stably supported as shown in FIG. 8.

In the cup holder 10 according to the present invention, a user can rotate and fix the support member 21 so that it can closely contact the outer surface of the container 1 depending on the size of the container 1 thereby stably supporting the container 1 of various sizes in the container insertion 11.

As described above, a cup holder for a vehicle according to embodiments of the present invention comprises a support member that can rotate horizontally with respect to a rotary shaft of a surrounding portion of a container insertion member and thus closely contact the outer surface of a beverage container inserted into the container insertion member. A locking member is adapted to fix the support member at a predetermined rotation angle on the rotary shaft using a button installed in the support member. Therefore, it is possible to stably support a beverage container of various sizes in a container irrespective of the sizes of the same. Further, it can also prevent noises resulted from a shaky movement of a beverage container as well as beverage spill.

What is claimed is:

1. A cup holder for a vehicle having a container insertion member for accommodating a beverage container therein, said cup holder comprising:
   a rotation bushing installed in such a manner that said rotation bushing encompasses an outer surface of a rotary shaft on a surrounding portion of the container insertion member, and compresses or decompresses the outer surface of the rotary shaft, so that rotation on the rotary shaft is selectively limited;
   a support member installed in an upper side of the rotation bushing and having a curved surface closely contacting an outer surface of a beverage container accommodated in the container insertion member when the support member is rotated with respect to the rotary shaft together with the rotation bushing; and
   button means installed in the support member, in such a manner that the rotation bushing and the support member are rotated together, and connected with the rotation bushing through a locking part, so that the locking part compresses or decompresses the rotation bushing;
   wherein said rotation bushing includes a cylindrical elastic compression part encompassing the outer surface of the rotary shaft and outwardly elongated open ends separated from each other with a predetermined gap, wherein said rotation bushing compresses or decompress the outer surface of the rotary shaft by adjusting the gap between the elongated open ends in response to the locking part of the button means;
   and wherein said button means is installed in an engaging hole of the support member and comprises two parallel locking parts elongated downwardly from a lower surface thereof, wherein the locking parts are operatively connected with the rotation bushing in such a manner that front ends of the two locking parts are inserted into a groove formed on outer surfaces of the elongated open ends of the rotating bushing, and slanted surfaces formed on inner surfaces of the front ends of the two locking parts slide on wedge-shaped slanted surfaces formed on the outer surfaces of the elongated open ends of the rotating bushing, so that the rotation bushing compresses or decompress the outer surface of the rotary shaft by adjusting the gap between the elongated open ends in response to the locking part of the button means.

2. The cup holder according to claim 1, wherein said button means comprises a push-lock button that is inserted and slidably installed in an engaging hole of the support member, supported by a one-touch operation part installed in the engaging hole and implemented by a one-touch method of a press and release operation.

3. The cup holder according to claim 1, wherein said button means comprises a seesaw button having a center portion connected with a hinge part installed in an engaging hole of the support member and being rotatable at a predetermined angle in the engaging hole, the locking part having slanted surfaces on which the locking part is moved upwardly and downwardly during rotation on a corresponding slanted surface of both ends of a compression part cooperating with the rotary shaft.

4. The cup holder according to claim 1, wherein said button means comprises a slide button that is slidable forwardly and backwardly by a slide means installed in an engaging hole of the support member, and the locking parts are bent toward the elongated open ends, the locking part having two slanted surfaces horizontally sliding on corresponding slanted surfaces of the elongated open ends of the rotating bushing.

5. The cup holder according to claim 1, wherein said support member comprises a handle protruding upwardly.

* * * * *